(12) United States Patent
Tsuchikawa et al.

(10) Patent No.: US 8,214,138 B2
(45) Date of Patent: Jul. 3, 2012

(54) MAP DISPLAY APPARATUS

(75) Inventors: Kazutomo Tsuchikawa, Kariya (JP); Noriko Katoh, Toyoake (JP); Takashi Ishizaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 648 days.

(21) Appl. No.: 12/379,740

(22) Filed: Feb. 27, 2009

(65) Prior Publication Data

US 2009/0228197 A1 Sep. 10, 2009

(30) Foreign Application Priority Data

Mar. 6, 2008 (JP) ................................ 2008-056359

(51) Int. Cl.
*G01C 21/30* (2006.01)
(52) U.S. Cl. ........................................ 701/208; 701/200
(58) Field of Classification Search .................. 701/208, 701/200
See application file for complete search history.

(56) References Cited

U.S. PATENT DOCUMENTS

| | | | | |
|---|---|---|---|---|
| 5,852,791 | A | * | 12/1998 | Sato et al. ...................... 701/217 |
| 6,178,377 | B1 | * | 1/2001 | Ishihara et al. ................. 701/200 |
| 6,377,886 | B1 | | 4/2002 | Gotou et al. |
| 2003/0023374 | A1 | * | 1/2003 | Shimabara .................... 701/212 |

FOREIGN PATENT DOCUMENTS

| | | |
|---|---|---|
| JP | A-08-210868 | 8/1996 |
| JP | A-2001-255160 | 9/2001 |
| JP | A-2002-022473 | 1/2002 |
| JP | A-2002-286479 | 10/2002 |
| JP | A-2003-207359 | 7/2003 |
| JP | A-2005-003431 | 1/2005 |
| JP | A-2006-023211 | 1/2006 |
| JP | A-2007-017175 | 1/2007 |

OTHER PUBLICATIONS

Decision to Grant Patent in corresponding Japanese Patent Application No. 2008-056359 mailed Feb. 2, 2001 (with English Patent Memo).

* cited by examiner

*Primary Examiner* — Rober M. Pond
(74) *Attorney, Agent, or Firm* — Posz Law Group, PLC

(57) ABSTRACT

Destination information, which includes as a retrieval condition an address of a destination spot, is received externally. Under the received retrieval condition of the address, a spot retrieval is performed with reference to own map data to thereby acquire a specified spot and second coordinates data indicating the specified spot. When the received destination information includes first coordinates data indicating the destination spot, it is determined whether a direct distance between a first spot indicated by the first coordinates data and a second spot indicated by the second coordinates data is equal to or less than a threshold value. When the direct distance is equal or less than the threshold value, the second spot is displayed as a destination on a map. When the direct distance is greater than the threshold value, the first spot is displayed as a destination on a map.

14 Claims, 2 Drawing Sheets

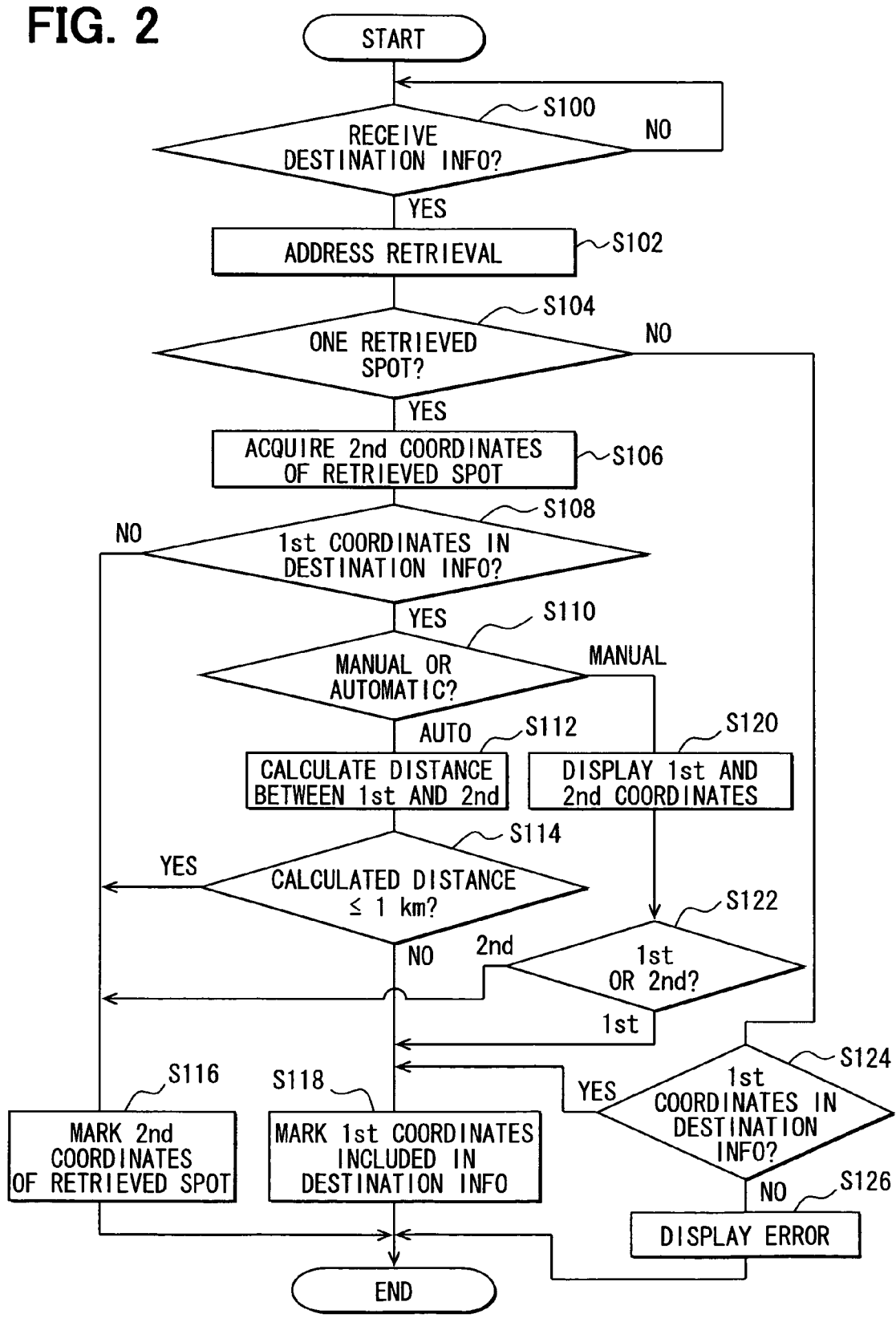

MAP DISPLAY APPARATUS

CROSS REFERENCE TO RELATED APPLICATION

This application is based on and incorporates herein by reference Japanese Patent Application No. 2008-56359 filed on Mar. 6, 2008.

FIELD OF THE INVENTION

The present invention relates to a map display apparatus for retrieving a spot according to a retrieval condition included in destination information, which is received from an outside, and displaying the retrieved spot on a map.

BACKGROUND OF THE INVENTION

Patent document 1: JP-2005-3431 A
Patent document 2: JP-2002-286479 A

Patent document 1 discloses a map display apparatus to acquire telephone book data from a storage medium of a cellular phone using a communication function of the cellular phone. The telephone book data has individual information including a name, address, and telephone number. The apparatus then specifies spot coordinates based on the address or telephone number included in the individual information to thereby display contents of the individual information on a position on a map (also referred to an on-map position) corresponding to the specified spot coordinates.

Patent document 2 discloses a map display apparatus having: a storage medium storing map data in which place names, telephone numbers, and addresses in association with coordinates data; and a communication device communicating with an external database for storing map data. When the data corresponding to destination information is not stored in the internal storage medium, the apparatus acquires coordinates data corresponding to the destination information from the external database using the communication device to thereby specify a destination. Thus, a destination can be specified even without a new place name or a new telephone number being internally stored in the storage medium.

The apparatus in Patent document 1 specifies a spot coordinates based on the address or telephone number to thereby display the content of the individual information on the position on the map corresponding to the specified spot coordinates. Such individual information may include address information, which does not contain an upper layered information item such as a prefecture or a city. The apparatus may therefore specify a spot coordinates, which has the same place name but is completely different from the targeted one to thereby cause a problem that the contents of the individual information is displayed in a wrong position.

That is, when a spot is retrieved by using a name, address, or telephone number as a retrieval condition and the retrieved spot is directly displayed on a map, a problem may occur that the accurate spot is not displayed.

Further, the apparatus in Patent document 2 acquires the coordinates data corresponding to the destination information from an external database and specifies a position corresponding to the coordinates data as a destination. Therefore, there may be a difference between internal map data stored in the storage medium and external map data stored in the external database. When the coordinates data acquired from the external database has a displacement, a problem may occur that the destination is displayed in a position displaced from the proper one.

SUMMARY OF THE INVENTION

It is an object to display a retrieved spot at a more accurate position.

According to a first example of the present invention, a map display apparatus is provided as follows. A spot retrieval portion is configured to externally acquire destination information including, with respect to a destination spot, (i) a first coordinates data and (ii) any one of a name, an address, and a telephone number, and perform a spot retrieval using the acquired any one of the name, the address, and the telephone number as a retrieval condition to acquire a specified spot. A coordinates data acquisition portion is configured to refer to own map data to thereby acquire a second coordinates data for indicating the specified spot, which is acquired by the spot retrieval portion. A distance determination portion is configured to determine a distance between a first spot indicated by the first coordinates data and a second spot indicated by the second coordinates data is equal to or less than a predetermined threshold value. A display management portion is configured to, when it is determined that the distance is equal to or less than the threshold value, display the second spot indicated by the second coordinates data, as a destination, on a map.

Under the above configuration, when it is determined that the distance between the first spot and the second spot is equal to or less than the threshold value, the second spot indicated by the second coordinates data, which is acquired internally with reference to the own map data, is marked as a destination on a map. Thereby, the first spot indicated by the first coordinates data included in the destination information is displayed on the map as if the first spot were amended to the second spot indicated by the second coordinates data acquired by referring to the own map data. Even if the map data used in the transmitting party (e.g., database in an external call center) of the destination information and the internal own map data stored in the storage medium have some differences in respect of a coordinates, the retrieved spot can be displayed on a more accurate position without displaying the destination on a misplaced or displaced position.

According to a second example of the present invention, a map display apparatus is provided as follows. A spot retrieval portion is configured to externally acquire destination information including, with respect to a destination spot, (i) a first coordinates data and (ii) any one of a name, an address, and a telephone number, and perform a spot retrieval using the acquired any one of the name, the address, and the telephone number as a retrieval condition to acquire a specified spot. A coordinates data acquisition portion is configured to refer to own map data to thereby acquire a second coordinates data for indicating the specified spot, which is acquired by the spot retrieval portion. A distance determination portion is configured to determine a distance between a first spot indicated by the first coordinates data and a second spot indicated by the second coordinates data is equal to or less than a predetermined threshold value. A display management portion is configured to, when it is determined that the distance is greater than the threshold value, display the first spot indicated by the first coordinates data, as a destination, on a map.

If a spot retrieval is performed using a received search condition (i.e., any one of a name, an address, and a telephone number) and a resultant retrieved spot is directly displayed on a map, a misplaced or wrong spot might be displayed as a destination on a map. In contrast, according to the above-mentioned configuration, when it is determined that the distance between the first spot and the second spot is greater than a threshold value, the first spot indicated by the first coordinates data included in the destination information is marked as a destination on a map. Without displaying a wrong spot as a destination on a map, a retrieved spot can be displayed at a more accurate position.

According to a third example of the present invention, a map display apparatus is provided as follows. A spot retrieval portion is configured to externally acquire destination information including, with respect to a destination spot, (i) a first coordinates data and (ii) any one of a name, an address, and a telephone number, and perform a spot retrieval using the acquired any one of the name, the address, and the telephone number as a retrieval condition to acquire a specified spot. A coordinates data acquisition portion is configured to refer to own map data to thereby acquire a second coordinates data for indicating the specified spot, which is acquired by the spot retrieval portion. A distance determination portion is configured to determine a distance between a first spot indicated by the first coordinates data and a second spot indicated by the second coordinates data is equal to or less than a predetermined threshold value. A display management portion configured to display (i) the second spot indicated by the second coordinates data as a destination on a map when it is determined that the distance is equal to or less than the threshold value, and (ii) the first spot indicated by the first coordinates data as the destination on the map when it is determined that the distance is greater than the threshold value.

Under the above configuration, advantages or effects provided in the configurations of the first and second examples of the present invention can be provided as the same time.

As yet another example of the present invention, a method is provided for displaying a destination spot in a map display apparatus in a vehicle. The method comprises: (i) transmitting a destination condition to a database center outside of the vehicle; (ii) acquiring externally, from the database center, destination information including, with respect to a destination spot, a first coordinates data and a retrieval condition being any one of a name, an address, and a telephone number; (iii) acquiring internally a specified spot and a second coordinates data for indicating the specified spot by searching own map data, which is provided inside of the vehicle, under the acquired retrieval condition; (iv) performing a determination as to whether a distance between the externally acquired first coordinates data and the internally acquired second coordinates data is greater than a predetermined threshold value; and (v) marking a spot as a destination on a map, the spot being indicated by either the externally acquired first coordinates data or the internally acquired second coordinates data based on a result of the determination as to whether the distance therebetween is greater than the threshold value.

BRIEF DESCRIPTION OF THE DRAWINGS

The above and other objects, features, and advantages of the present invention will become more apparent from the following detailed description made with reference to the accompanying drawings. In the drawings:

FIG. 2 is a flowchart illustrating a process executed by a control section of the navigation apparatus.

DETAILED DESCRIPTION OF THE PREFERRED EMBODIMENTS

Figure 1:
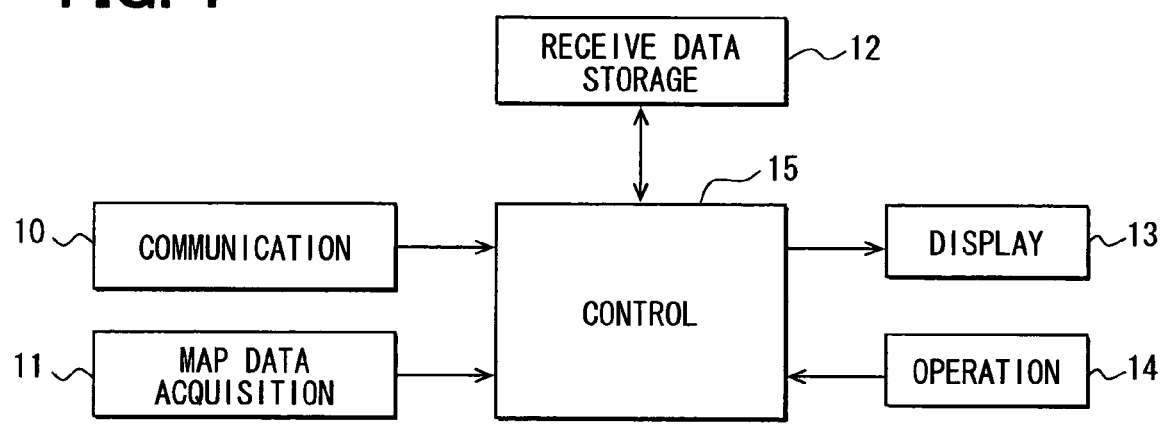
FIG. 1 is a diagram illustrating a configuration of a navigation apparatus as a map display apparatus according to an embodiment of the present invention.

A configuration of a map display apparatus according to an embodiment of the present invention is illustrated in FIG. 1.

The map display apparatus is configured as a navigation apparatus to retrieve a guidance route up to a destination and navigate a user therealong. The navigation apparatus, which is mounted in a vehicle, includes a communication section 10, a map data acquisition section 11, a receive data storage section 12, a display section 13, an operation section 14, and a control section 15.

The communication section 10 is to access a communication network via one of wireless base stations located in several areas to thereby communicate with an external communication device on the communication network outside of the vehicle.

The map data acquisition section 11 is to acquire map data from a nonvolatile storage medium, which includes a CD, DVD, hard disk drive (HDD), and memory card. Such a storage medium is interfaced with (e.g., is inserted into) the map data acquisition section 11 inside of the vehicle.

The map data include road data, map matching data, background date, and facility data. The road data is to indicate, with respect to each link, a link ID, a link length, a road width, a road type, the number of lanes, positions of traffic signals, etc. The map matching data is to improve position detection accuracy. The background data is to indicate a position, configuration, and name of each of rivers, lakes, seas, railroads, facilities, etc. The facility data is to associate a name, address, and telephone number of each of facilities in several areas with coordinates data, which may function as an absolute position.

The receive data storage section 12 includes a memory for storing receive data received externally from an outside (i.e., from an outside of the vehicle) via the communication section 10.

The display section 13 includes a display screen such as a liquid crystal display and displays on the display screen an image according to a video signal inputted from the control section 15.

The operation section 14 includes a touch-sensitive switch superimposed in a front side of the display screen of the display section 13, and a mechanical switch arranged around the display screen of the display section 13. The section 14 outputs a signal to the control section 15 according to user's switch operation.

The control section 15 includes a computer having a CPU, memory, I/O, etc. (none shown); the CPU executes several processes such as an external communication process, a receive data storage process, and a facility retrieval process according to a relevant program stored in the memory.

The external communication process is to establish a communication link with an external call center, which may function as an example of an outside database center, outside of the vehicle via the communication section 10 based on a user's operation. The receive data storage process is to receive destination information from the call center via the communication section 10 and then store the receive destination information in the receive data storage section 12. The facility retrieval process is to perform a facility retrieval based on a user's operation via the operation section 14 and display a retrieval result or retrieved spot on the display screen of the display section 13.

When establishing a communication link with the call center is demanded by a user's operation via the operation section 14, the navigation apparatus establishes a communication link with the call center via the communication section 10 to come to be in a state in which the user can have a telephone call with an operator in the call center (i.e., referred to as a call-enabled state). In addition, when the user tells the operator of an intended destination condition, destination information meeting the destination condition is transmitted from the call center. The destination information contains a coordinates data for indicating a relevant destination spot and an address as a retrieval condition (also referred to as a search condition). Herein, there is a case that the destination information does not contain any coordinates data for indicating a relevant destination spot.

The control section 15 performs a spot retrieval according to the search condition included in the destination information, which is acquired externally, i.e., is transmitted from the call center. The control section 15 then displays the retrieved spot on a map.

FIG. 2 shows a flowchart of the above process executed by the control section 15. The control section 15 establishes a communication link with the call center via the communication section 10, and then starts the process illustrated in FIG. 2.

First, at S100, it is determined whether destination information is received from the external call center outside of the vehicle on which the navigation apparatus (i.e., the map display apparatus) is mounted.

While not receiving any destination information, the processing repeats the determination at S100. When receiving destination information, the determination at S100 is affirmed. An address retrieval is then executed at S102. For instance, an address retrieval is to perform a retrieval by using an address included in the destination information as a retrieval condition while referring to the facility data in the own map data (i.e., the internal map data provided inside of the vehicle). In other words, an address retrieval is to search the facility data in the map data for a target address under the retrieval condition of the address included in the destination information.

Next, it is determined at S104 whether the number of retrieval results (i.e., the number of retrieved spots) from the address retrieval is one.

When it is determined that the number of retrieval results is one, the determination at S104 is affirmed. Next, a coordinates data of the retrieved spot is acquired at S106. For instance, a coordinates data indicating the retrieved spot in the address retrieval (referred to as a second coordinates data with respect to the retrieved spot) is acquired internally by referring to the own map data at S106.

Next, it is determined at S108 whether the received destination information includes a coordinates data (referred to as a first coordinates data).

When the coordinates data indicating the relevant destination spot is included in the destination information, the determination at S108 is affirmed. Next, it is determined at S110 whether the setting of spot display is designated previously by the user as manual selection or automatic selection.

If the automatic selection is designated, an optimum spot is automatically selected without any user's additional operation or selection by calculating a distance between (i) a spot indicated by the first coordinate data included in the externally received destination information and (ii) a spot indicated by the second coordinates data indicating the retrieved spot.

In contrast, if the manual selection is designated, the user operates to select either (i) a spot indicated by the first coordinate data included in the externally received destination information or (ii) a spot indicated by the second coordinates data indicating the retrieved spot. Herein, a spot indicated by a coordinates data is also referred to as a coordinates position.

When the automatic selection is designated, a direct distance is calculated which is a distance in a straight line between the externally received coordinates position and the coordinates position of the retrieved spot at S112. In detail, a direct distance is calculated in a straight line between a first spot indicated by the first coordinates data for indicating destination spot included in the destination information and a second spot indicated by the second coordinates data for indicating the retrieved spot.

Next, it is determined at S114 whether the direct distance between the first spot and the second spot is equal to or less than a predetermined threshold value (for example, 1 km).

When the direct distance between the first spot and the second spot is equal to or less than the threshold value, the determination at S114 is affirmed. Thus, the coordinates position of the retrieved spot is illustrated or marked as a destination on the map at S116. In other words, the second spot indicated by the second coordinates data for indicating the retrieved spot is illustrated or marked as a destination on the map.

Thus, when the direct distance between the first spot and the second spot is equal to or less than the threshold value, it is supposed or determined that the second spot indicated by the second coordinates data for indicating the retrieved spot is not wrong, thereby displaying the second spot as a destination on the map.

In contrast, when the direct distance between the first spot and the second spot is greater than the threshold value, the determination at S114 is negated. Thus, the coordinates position included in the externally received destination information is illustrated or marked as a destination on the map at S118. In other words, the first spot indicated by the first coordinates data included in the destination information is illustrated or marked as a destination on the map.

Thus, when the direct distance between the first spot and the second spot is greater than the threshold value, it is supposed or determined that the second spot corresponding to the second coordinates data for indicating the retrieved spot is wrong, thereby displaying the first spot instead of the second spot as a destination on the map.

Further, when the above user setting or designation is the manual selection, both the first and second coordinates positions are displayed at S120. For example, while both the coordinates positions are displayed, a display window appears in the display screen so as to urge a user to select either.

It is then determined at S122 whether the coordinates selected by the user is the coordinates of the retrieved spot or the externally received coordinates (i.e., the first coordinates data or the second coordinates data).

When the coordinates of the retrieved spot is selected by the user, the processing advances to S116. Thus, the second spot indicated by the second coordinates data for indicating the retrieved spot is illustrated or marked as a destination on the map.

When the externally received coordinates is selected by the user, the processing advances to S118. Thus, the first spot indicated by the first coordinates data included in the destination information is illustrated or marked as a destination on the map.

Further, when the number of retrieved results of the address retrieval is (i) zero or (ii) two or more (i.e., not only one), the determination at S104 is negated. It is then determined at S124 whether the received destination information includes a coordinates data. That is, it is determined whether the received destination information includes coordinates data indicating a destination spot (i.e., the first coordinates data).

When the received destination information includes coordinates data indicating a destination spot (i.e., the first coordinates data), the determination at S124 is affirmed and the processing advances to S118. Thus, a second spot indicated by the first coordinates data included in the destination information is illustrated or marked as a destination on the map.

When the received destination information does not include coordinates data indicating a destination spot (i.e., the first coordinates data), the determination at S124 is negated. Next, "no retrieval result" or "error" is displayed at S126. For instance, when the number of retrieved results of the address retrieval is zero, a message, which indicates that there is no retrieved result, appears; when the number of retrieved results of the address retrieval is two or more, a message, which indicates that an error occurs, appears. The present process is then ended.

Under the above configuration of the present embodiment, the followings are provided:

(i) destination information includes (a) a first coordinates data for indicating a destination spot and (b) any one of, as a search condition with respect to the destination spot, a name, an address, and a telephone number;

(ii) after receiving the destination information externally (e.g., from an external call center outside of the vehicle), a spot retrieval is performed internally using the received search condition (i.e., any one of the name, the address, and the telephone number) with reference to an own map data inside of the vehicle to specify a spot;

(iii) a second coordinates data for indicating the specified spot obtained by the spot retrieval is acquired internally (i.e., from the facility data in the own map data, which is provided in the navigation apparatus inside of the vehicle);

(iv) it is determined whether a distance (e.g., a direct distance) between a first spot indicated by the externally acquired first coordinates data and a second spot indicated by the internally acquired second coordinates data is equal to or less than a predetermined threshold value;

(v) when it is determined that the distance is equal to or less than the threshold value, the second spot indicated by the internally acquired second coordinates data is marked as a destination on a map; and (vi) when it is determined that the distance is greater than the threshold value, the first spot indicated by the externally acquired first coordinates data is marked as a destination on a map.

Thus, when it is determined that the distance between the first spot and the second spot is equal to or less than the threshold value, the second spot indicated by the second coordinates data, which is acquired internally with reference to the own map data, is marked as a destination on a map. Thereby, the first spot indicated by the first coordinates data included in the destination information seems to be displayed on the map such that the first spot is amended to the second spot indicated by the second coordinates data acquired by referring to the map data. Even if the map data used in the transmitting party (e.g., database in the external call center) of the destination information and the internal own map data stored in the storage medium inside of the vehicle have some differences in respect of a coordinates (e.g., a three dimensional coordinates), the retrieved spot can be displayed on a more accurate position without displaying the destination on a misplaced or displaced position.

Further, if a spot retrieval is performed using the received search condition (i.e., any one of the name, the address, and the telephone number) and a resultant retrieved spot is directly displayed on a map, a destination might be marked in a misplaced or wrong spot. In contrast, according to the above-mentioned configuration of the present embodiment, when it is determined that the distance between the first spot and the second spot is greater than a threshold value, the first spot indicated by the first coordinates data included in the externally acquired destination information is marked as a destination on a map. This prevents a wrong spot from appearing as a destination on a map, thereby enabling the retrieved spot to be shown in a more accurate position on a map.

Further, when a manual selection, in which a user selects either the first spot or the second spot as a destination is designated, both the first spot and the second spot are first displayed on a map and either the first spot or the second spot is selected by the user and the selected spot is marked on a map as a destination. Thus, a spot which a user intends to select as a destination can be displayed on a map.

In addition, the present invention is not limited to the above embodiment and can be achieved in various modified manners based on the scope of the present invention.

In the above embodiment, the retrieval for retrieving a destination spot is executed at S102 as the address retrieval using as a retrieval condition an address included in the destination information. Without being limited to the address retrieval, another retrieval may be performed. A spot retrieval can be performed as a name retrieval or a telephone retrieval using, of a destination, a name or a telephone number included in destination information, respectively.

Further, in the above embodiment, the direct distance, which is a distance in a straight line between the coordinates position of the retrieved spot and the received coordinates position, is calculated at S112; then, it is determined at S114 whether the direct distance is equal to or less than a predetermined threshold value. Without need to be limited to a direct distance, another one may be adopted. For example, another distance can be measured along roads interconnecting between the coordinates position of the retrieved spot and the received coordinates position.

Further, in the above embodiment, when it is determined at S114 that the direct distance between the first spot and the second spot is equal to or less than the threshold value, the processing proceeds to S116, where the second spot indicated by the second coordinates data for indicating the retrieved spot is marked as a destination on a map. Without need to be limited to such a display operation, for example, the first spot indicated by the first coordinates data included in the destination information may be marked as a destination on a map while displaying a message which indicates that an accuracy of the display position of the destination may be low.

Furthermore, in the above embodiment, when it is determined at S114 that the direct distance between the first spot and the second spot is greater than the threshold value, the processing proceeds to S118, where the first spot indicated by the first coordinates data included in the destination information is marked as a destination on a map. Without need to be limited to such a display, for example, the first spot indicated by the first coordinates data included in the destination information is illustrated or marked as a destination on a map while displaying a message which indicates that an accuracy of the display position of the destination may be low.

Further, in the above embodiment, there may be a case that the destination information sometimes does not include a first coordinates data indicating a destination spot. It is thus determined at S108 whether the received destination information includes a coordinates data. In contrast, it can be designed that any destination information includes a coordinates data of a destination spot. In this case, the determination at S108 can be eliminated.

Further, in the above embodiment, the destination information is received from the external call center. For example, a map display apparatus may be provided with an interface which communicates with a cellular phone or PDA (Personal Digital Assistant) to thereby receive destination information via the interface.

Further, in the above embodiment, after it is determined at S104 that the number of retrieval results from the address retrieval is one, it is then determined at S108 whether the received destination information includes a coordinates data. However, it can be modified as follows. That is, after it is determined at S108 whether the received destination information includes a coordinates data, it may be then determined at S104 whether the number of retrieval results from the address retrieval is one.

Further, in the above embodiment, when it is determined at S104 that the number of retrieved results of the spot retrieval is one, the processing advances to S106. For example, it can be designed as follows. That is, even if the number is more than one, the processing may advance to S106, where coordinates of retrieved spots can be acquired.

(Functions)

The control section 15 may function at S102 as an example of a spot retrieval means or portion. The control section 15 may function at S108 as an example of a coordinates data determination means or portion. The control section 15 may function at S106 as an example of a coordinates data acquisition means or portion. The control section 15 may function at S114 as an example of a distance determination means or portion. The control section 15 may function at S116, S118, S120, and S122 as an example of a display management means or portion. The control section 15 may function at S110 as an example of a selection determination means or portion.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A map display apparatus comprising:
a processor device; and
a display device controlled by the processor device,
wherein the processor device is configured to
externally acquire destination information including, with respect to a destination spot, (i) a first coordinates data and (ii) any one of a name, an address, and a telephone number, and
perform a spot retrieval using the externally acquired any one of the name, the address, and the telephone number as a retrieval condition to acquire a specified spot;
refer to own map data to thereby acquire a second coordinates data for indicating the specified spot, which is acquired externally;
determine whether a distance between a first spot indicated by the first coordinates data and a second spot indicated by the second coordinates data is equal to or less than a predetermined threshold value;
display on the display device the second spot instead of the first spot as a destination, when it is determined that the distance is not greater than the threshold value; and
display on the display device the first spot indicated by the first coordinates data instead of the second spot, as a destination, on a map, when it is determined that the distance is greater than the threshold value.

2. The map display apparatus according to claim 1 wherein the destination information, which is externally acquired, does not necessarily include the first coordinates data of the destination spot,
the apparatus further being configured to:
determine whether the first coordinates data is included in the destination information,
when it is determined that the destination information includes the first coordinates data, determine whether the distance between the first spot indicated by the first coordinates data and the second spot indicated by the second coordinates data is equal to or less than the predetermined threshold value.

3. The map display apparatus according to claim 2 wherein when it is determined that the destination information does not include the first coordinates data,
the processor causes the second spot indicated by the second coordinates data to be displayed as the destination on the map.

4. The map display apparatus according to claim 1 wherein the processor is configured to
determine whether a manual selection, in which a user selects either the first spot or the second spot as the destination, is designated,
when it is determined that the manual selection is designated, mark, on the map, either the first spot or the second spot selected by the user as the destination while displaying the first spot and the second spot on the map.

5. The map display apparatus according to claim 1 wherein when it is determined that the distance between the first spot indicated by the first coordinates data and the second spot indicated by the second coordinates data is not equal to or less than the predetermined threshold value, it is judged that the second spot indicated by the second coordinates data acquired by the coordinates data acquisition portion is different from the first spot indicated by the first coordinates data.

6. The map display apparatus according to claim 1 wherein the predetermined threshold value used when determining whether the distance between the first spot indicated by the first coordinates data and the second spot indicated by the second coordinates data is not equal to or less than the predetermined threshold value is one kilometer.

7. The map display apparatus according to claim 1 wherein the processor device
calculates the distance as a direct distance in a straight line between the first spot and the second spot, and then provides the distance to determine whether the distance is equal to or less than the predetermined threshold value.

8. A map display apparatus comprising:
a processor device; and
a display device controlled by the processor device,
wherein the processor device is configured to
externally acquire destination information including, with respect to a destination spot, (i) a first coordinates data and (ii) any one of a name, an address, and a telephone number, and perform a spot retrieval using the acquired any one of the name, the address, and the telephone number as a retrieval condition to acquire a specified spot;

refer to own map data to thereby acquire a second coordinates data for indicating the specified spot, which is acquired;

determine whether a distance between a first spot indicated by the first coordinates data and a second spot indicated by the second coordinates data is equal to or less than a predetermined threshold value; and display
  (i) the second spot indicated by the second coordinates data instead of the first spot as a destination on a map when it is determined that the distance is equal to or less than the threshold value, and
  (ii) the first spot indicated by the first coordinates data instead of the second spot as the destination on the map when it is determined that the distance is greater than the threshold value.

9. The map display apparatus according to claim 8 wherein the destination information, which is externally acquired, does not necessarily include the first coordinates data of the destination spot, the apparatus further being configured to:

determine whether the first coordinates data is included in the destination information, when it is determined that the destination information includes the first coordinates data, determine whether the distance between the first spot indicated by the first coordinates data and the second spot indicated by the second coordinates data is equal to or less than the predetermined threshold value.

10. The map display apparatus according to claim 9, wherein the processor is configured to display the second spot indicated by the second coordinates data as the destination on the map, when it is determined that the destination information does not include the first coordinates data.

11. The map display apparatus according to claim 8 wherein the processor is further configured to determine whether a manual selection, in which a user selects either the first spot or the second spot as the destination, is designated, mark, on the map, either the first spot or the second spot selected by the user as the destination while displaying the first spot and the second spot on the map, when it is determined that the manual selection is designated.

12. The map display apparatus according to claim 8 wherein when it is determined that the distance between the first spot indicated by the first coordinates data and the second spot indicated by the second coordinates data is not equal to or less than the predetermined threshold value, it is judged that the second spot indicated by the second coordinates data acquired by the coordinates data acquisition portion is different from the first spot indicated by the first coordinates data.

13. The map display apparatus according to claim 8 wherein the predetermined threshold value used when determining whether the distance between the first spot indicated by the first coordinates data and the second spot indicated by the second coordinates data is not equal to or less than the predetermined threshold value is one kilometer.

14. The map display apparatus according to claim 8 wherein the processor device calculates the distance as a direct distance in a straight line between the first spot and the second spot, and then provides the distance to determine whether the distance is equal to or less than the predetermined threshold value.

* * * * *